United States Patent Office 3,038,871
Patented June 12, 1962

3,038,871
FLAME RESISTANT POLY(DIPHENYL)-TYPE COMPOSITIONS
James D. Doedens, Midland, Mich., assignor to The Dow Chemical Company, Midland, Mich., a corporation of Delaware
No Drawing. Filed Oct. 5, 1959, Ser. No. 844,200
6 Claims. (Cl. 260—37)

This invention concerns composite structures containing inert inorganic fillers compounded with resinous poly-(diphenyl)-type binders, i.e., poly(diphenyl), poly(diphenylmethane), poly(o-phenylphenol) and poly(p-phenylphenol). It also concerns their method of manufacture.

In accordance with this invention, novel structural materials having desirable physical properties are prepared by a process which comprises combining various inert inorganic fillers, such as mica, glass rovings, fibrous glass mats, fibrous glass cloth, silica, alumina, magnesia, etc. with a halomethylated diphenyl type monomer as such or in solution or emulsion form, and heating the mass to liberate hydrogen halide and form a condensed resinous binder filled with inorganic filler.

Suitable binders for the practice of this invention include the condensation products resulting from the reaction of a Friedel-Crafts catalyst and a halomethyl-, i.e., chloromethyl- or bromomethyl-diphenyl, diphenylmethane, o-phenylphenol and p-phenylphenol, ringing from their monohalomethyl to their tetrahalomethyl substitution products, and including their commercial mixtures which contain small amounts of non-halomethylated diphenyl type compounds. Hereafter diphenyl, diphenylmethane, o-phenylphenol and p-phenylphenol will be referred to as diphenyl type compounds.

When the monomers indicated are compound with the indicated fillers and heat polymerized, hydrogen halide is evolved and solid or foamed condensation products are obtained depending on the halomethyl content of the monomer, the content of Friedel-Crafts catalyst, the temperature and the thickness of the monomer layer. Monomers having up to one halomethyl group per molecule on a statistical basis give solid products when polymerized. Other monomers having more than one halomethyl group per molecule give foams when polymerized at curing temperatures, e.g., between 90° and 400° C., preferably between 100° and 150° C. The monomers can be used individually or in admixture with one another. A mixture of mono- and di(halomethyl)diphenyl type compounds is particularly advantageous.

The halomethyl diphenyl type compounds, hereafter abbreviated as HMDP's, are used as such or in solution or emulsion form, advantageously containing between 5 and 75 weight percent of monomer when a solution is used; or between 5 and 25 weight percent when an emulsion is used, the balance being about 75 to 60 weight parts of water and about 5 to 14 weight parts of an oil-in-water emulsifying agent. The fillers are compounded with the monomers or their solutions or emulsions, generally to provide a resin uptake between 5 and 15 percent, by mixing, dipping, spraying and the like, draining, and heating at a polymerzing temperature ranging between about 90° and 400° C., preferably between 100° and 150° C., for a time sufficient to liberate hydrogen halide and give a condensation resin. Solutions containing about 5 to 75 weight percent monomer in aromatic hydrocarbon or halohydrocarbon solvents boiling between about 40° and 110° C. are advantageously used in the practice of this invention.

Suitable emulsifying agents include the following well-known types: alkylaryl sulfonates, exemplified by $C_{12}H_{25}$—$C_6H_4$—$SO_3Na$; fatty alkyl sulfates, exemplified by $C_{12}H_{25}OSO_3Na$; nonionic esters, exemplified by $C_{17}H_{33}CO_2C_2H_4$—$(OC_2H_4)_x$—OH; nonionic ethers, exemplified by $C_8H_{17}C_6H_4OC_2H_4$—$(OC_2H_4)_x$—OH; sulfonated fatty amides, exemplified by $C_{17}H_{33}$—$CON(CH_3)C_2H_4SO_3Na$ fatty amide condensates, exemplified by $C_{11}H_{23}CON(C_2H_4OH)_2$ and the cationic quaternary ammonias, exemplified by $C_{12}H_{25}(C_6H_5CH_2)$—$N(CH_3)_2Cl$. Mixtures such as that of sorbitan mono-oleate, polyoxyethylene esters of mixed fatty and resin acids and alkylamine aryl sulfonates are particularly advantageous as emulsifying agents for the HMDP's.

The HMDP's are prepared by reaction of a holomethylating agent, such as methyl chloromethyl ether, methyl bromomethyl ether, bis-(chloromethyl)ether, bis-(bromomethyl) ether or a mixture of formaldehyde and HCl or HBr with a diphenyl type compound, as specified, in the presence of a Friedel-Crafts type catalyst for the reaction, such as zinc chloride, aluminum chloride, ferric chloride, boron trifluoride, etc. Procedures for carrying out halomethylation reactions are well-known in the art, and can be applied in halomethylating diphenyl type compounds such as those mentioned above, to obtain HMDP's useful as starting materials in the practice of this invention. See, for example, U.S. Patent 2,911,380, filed August 26, 1955, and Organic Reactions, vol. I, pages 63–90 (1942). Mono- or poly-HMDP's or mixtures thereof can be obtained thereby, depending upon the proportions of halomethylating agent used, the extent of the halomethylation reaction and whether steps are taken to separate and purify individual HMDP's. Residual catalyst need not be removed. In fact, it promotes subsequent polymerization. When it is desired to accelerate the polymerization rate, additional amounts of catalyst are added to the monomer, advantageously to give from a trace up to about 2 weight percent total, monomer basis. It is not necessary that the HMDP's be separated or purified. On the contrary, mixtures of unseparated and unpurified HMDP's containing up to 50 weight percent of one or more unreacted diphenyl type compounds are commercially attractive. Such mixtures contain HMDP's of varying halomethyl content up to the tetrahalomethylated product, in addition to unreacted diphenyl type compound. Unreacted diphenyl type compounds enter into the condensation reaction via the Friedel-Crafts method.

The following examples are in illustration of the invention and are not intended to be limitative thereof.

EXAMPLE 1

*Chloromethyl o-Phenylphenol*

This material was dissolved in acetone to give a 35 percent solids concentration. The following mixtures therewith were prepared.

(A) 50 g. Johns Manville No. 7 asbestos and 25 g. solution.

(B) 25 g. perlite-plaster aggregate (perlite is an expanded volcanic glass) and 50 g. solution.

(C) 75 g. magnesium oxide and 25 g. solution.

The chlorine content of the monomer was 15.1 percent. Its analysis indicated 20–25 percent o-phenylphenol, 45–50 percent chloromethyl-, 20–25 percent dichloromethyl-, 1–2 percent trichloromethyl- and 0–1 percent tetrachloromethyl o-phenylphenol.

EXAMPLE 2

*Chloromethylated Diphenylmethane*

This material was dissolved in methylene chloride to give a 40 percent solids concentration. The following mixtures therewith were prepared:

(A) 25 g. perlite-plaster aggregate and 25 g. solution (B) 75 g. MgO and 25 g. solution
(C) 50 g. asbestos and 25 g. solution The chlorine content of the monomer was 16.65 percent. Its analysis indicated 15–20 percent diphenylmethane, 40–45 percent chloromethyl-, 25–30 percent dichloromethyl-, 1–3 percent trichloromethyl and 0–1 percent tetrachloromethyl-diphenylmethane.

EXAMPLE 3

*Chloromethylated Diphenyl*

This material was dissolved in methylene chloride to give a 40 percent solution. Mixtures of the following were prepared:

(A) 25 g. perlite-plaster aggregate and 25 g. solution
(B) 75 g. MgO and 25 g. solution
(C) 50 g. asbestos and 25 g. solution The chlorine content of the monomer was 15.2 percent. Its analysis indicated 20–25 percent diphenyl, 45–50 percent chloromethyl-, 20–25 percent dichloromethyl-, 1–2 percent trichloromethyl- and 0–1 percent tetrachloromethyl diphenyl.

The mixtures of Examples 1–3 were made by thoroughly stirring the dry inorganic materials in the solutions until each particle was coated. The mixtures were then allowed to stand at room temperature 16 hours to evaporate the solvent. Individually the mixtures were put in a 2″ x 4″ x ⅜″ mold, placed in a Carver press and cured for 15 min. at 150° C. and 625 p.s.i. In all cases an extremely hard molded material was recovered from the press having the following dimensions: 2″ x 4″ x ¼″. Each of these articles had the strength and appearance of transite. All of the binders adhered well and were insoluble in organic solvents and resistant to bases and acids.

Rate of burning was determined by allowing a ½″ x 4″ x ⅛″ piece of the molded material to touch an electrically heated bar which was cherry red (bar supplied by 350 watts power) for 3 minutes and measuring the amount of resin burned off, sample blackening, etc. during this time period. Masonite, transite, and white pine were run in this test also to give comparable results.

Results are summarized in the following table.

4.5″ x 4.5″ x 2 mm. and saturated with 30 g. chloromethylated diphenyl (15.2 percent chlorine) containing 0.3 g. ZnCl$_2$. The press was closed and the composition cured at 160° C. for 15 min. It was then oven cured for 15 min. at 150° C. The sample was then subjected to ASTM test D-757-44T. Average burning rate for five samples was 0.1430 inch per minute.

EXAMPLE 5

*Chloromethylated Diphenylmethane*

The procedure of Example 4 was repeated with the following:

(a) A quantity of 35 g. chloromethylated diphenylmethane (16.65 percent chlorine).
(b) The composition was cured in the press and did not need further curing in the oven.

ASTM Test D-757-44T results on five samples showed an average burning rate of 0.1741 inch per minute.

What is claimed is:

1. The combination of an inert inorganic filler and a polymeric Friedel-Crafts condensation product of the group of halomethylated diphenyl, diphenylmethane, o-phenylphenol and p-phenylphenol and mixtures thereof having from 1 to 4 halomethyl groups per molecule and wherein halomethyl is a member of the group consisting of chloromethyl and bromomethyl.
2. The composition of claim 1, wherein the filler is fibrous glass.
3. The composition of claim 1, wherein the filler is perlite-plaster aggregate.
4. The composition of claim 1, wherein the filler is exploded mica.
5. The composition of claim 1, wherein the filler is magnesia.
6. Method for making a composite structure of an inert inorganic filler and a polymeric diphenyl binder by condensing at a temperature ranging between 90° and 400° C. in the presence of a Friedel-Crafts catalyst, a monomer of the group of halomethylated diphenyl, diphenylmethane, o-phenylphenol, p-phenylphenol and

FLAME RESISTANT BINDERS FOR INORGANIC MATERIALS

| Sample No. | Binder [3] | Inorganic material | Percent binder in final product | Flame during burning test | ASTM D-757-44T | | General Description of Molded Article |
|---|---|---|---|---|---|---|---|
| | | | | | Inches/min. resin burn off | Inches/min. blackening of product | |
| 1 | CMOPP 15.1% Cl | asbestos | 15 | No | 0.00 | 0.145 | gray color, hard, looks like transite, much the same properties as phenolic bonded asbestos. |
| 2 | do | MgO | 10.8 | No | 0.031 | 0.125 | white color, hard on surfaces, softer bonding inside. |
| 3 | do | perlite-plaster | 15 | No | 0.041 | 0.145 | light yellow color, hard, good bonding. |
| 4 | CMDPM 16.65% Cl | asbestos | 16.7 | No | 0.00 | 0.104 | gray color, hard, looks and acts like transite, much the same properties as phenolic bonded asbestos. |
| 5 | do | MgO | 11.8 | No | 0.031 | 0.083 | white color, hard on surface, softer inside. |
| 6 | do | perlite-plaster | 16.7 | No | 0.062 | 0.145 | light gray color, hard, good bonding. |
| 7 | CMD 15.2% Cl | asbestos | 16.7 | No | 0.00 | 0.104 | looks like transite, hard, strong, difficult to saw. |
| 8 | do | MgO | 11.8 | No | 0.031 | 0.150 | white color, hard on surface, softer bond on inside. |
| 9 | do | perlite-plaster | 16.7 | No | 0.062 | 0.145 | light tan in color, hard, good bonding. |
| 10 | Masonite | | | Yes [1] | 0.250 | 0.333 | |
| 11 | Transite | | | No | 0.00 | 0.166 | |
| 12 | Pine | | | Yes [2] | 0.250 | 0.292 | |

[1] Flamed throughout whole 3 min. of test.
[2] Flame went out after 2.5 min. of test.
[3] CMOPP=Chloromethylated o-phenylphenol; CMDPM=chloromethylated diphenylmethane; CMD=chloromethylated diphenyl.

When a chloromethylated p-phenylphenol containing 16.8 percent Cl was substituted for the monomer of Example 1, similar advantageous results were obtained.

EXAMPLE 4

*Chloromethylated Diphenyl*

Four thicknesses of glass cloth were placed in a mold mixtures thereof having from 1 to 4 halomethyl groups per molecule and wherein halomethyl is a member of the group consisting of chloromethyl and bromomethyl in admixture with an inert inorganic filler in proportions at least sufficient to bind said inorganic filler.

No references cited.